United States Patent
Hirosawa et al.

(10) Patent No.: US 11,496,005 B2
(45) Date of Patent: Nov. 8, 2022

(54) STATOR, ELECTRIC MOTOR, COMPRESSOR, REFRIGERATING AND AIR CONDITIONING APPARATUS, AND METHOD FOR MANUFACTURING STATOR

(71) Applicant: Mitsubishi Electric Corporation, Tokyo (JP)

(72) Inventors: Yuji Hirosawa, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 16/496,102

(22) PCT Filed: May 10, 2017

(86) PCT No.: PCT/JP2017/017652
§ 371 (c)(1),
(2) Date: Sep. 20, 2019

(87) PCT Pub. No.: WO2018/207277
PCT Pub. Date: Nov. 15, 2018

(65) Prior Publication Data
US 2020/0099263 A1    Mar. 26, 2020

(51) Int. Cl.
*H02K 1/14* (2006.01)
*H02K 21/16* (2006.01)
(Continued)

(52) U.S. Cl.
CPC ............ *H02K 1/146* (2013.01); *F24F 1/08* (2013.01); *F25B 49/025* (2013.01); *H02K 1/276* (2013.01); *H02K 15/022* (2013.01); *H02K 21/16* (2013.01)

(58) Field of Classification Search
CPC .. F24F 1/08; F25B 49/025; F25B 1/00; H02K 15/022; H02K 1/02; H02K 1/146;
(Continued)

(56) References Cited

U.S. PATENT DOCUMENTS 5,757,108 A * 5/1998 Suzuki .................. H02K 1/141
310/216.036
6,525,444 B2 * 2/2003 Salem ..................... H02K 1/02
310/216.006
(Continued)

FOREIGN PATENT DOCUMENTS

CN    103329401 A    9/2013
CN    103999331 A    8/2014
(Continued)

OTHER PUBLICATIONS

Japanese Office Action dated Feb. 2, 2021, issued in corresponding JP Patent Application No. 2019-516787 (and English Machine Translation).
(Continued)

*Primary Examiner* — Alex W Mok
(74) *Attorney, Agent, or Firm* — Posz Law Group, PLC

(57) ABSTRACT

A stator includes a yoke portion, and a tooth portion located inside the yoke portion in a radial direction. A fracture surface ratio of an inner surface of the tooth portion in the radial direction is lower than a fracture surface ratio of a side surface of the yoke portion.

22 Claims, 11 Drawing Sheets

(51) Int. Cl.
  *H02K 1/27* (2022.01)
  *H02K 15/02* (2006.01)
  *F25B 49/02* (2006.01)
  *F24F 1/08* (2011.01)
  *H02K 1/276* (2022.01)

(58) Field of Classification Search
  CPC ........ H02K 1/276; H02K 21/16; H02K 15/02; H02K 1/06; H02K 1/148; H02K 2213/03
  USPC .................................................. 310/156.56
  See application file for complete search history.

(56) References Cited

U.S. PATENT DOCUMENTS

| | | | |
|---|---|---|---|
| 2008/0224574 A1 | 9/2008 | Enomoto et al. | |
| 2008/0238237 A1* | 10/2008 | Nishihama | H02K 17/165 310/166 |
| 2011/0258840 A1* | 10/2011 | Urano | H02K 1/148 29/596 |
| 2012/0156441 A1* | 6/2012 | Gerster | C22C 19/07 428/195.1 |
| 2012/0159983 A1* | 6/2012 | Tsutsumi | H02K 1/14 62/498 |
| 2013/0278103 A1 | 10/2013 | McPherson et al. | |
| 2014/0210284 A1* | 7/2014 | Banba | H02K 29/03 310/43 |
| 2015/0340914 A1* | 11/2015 | Asakura | H02K 21/16 310/208 |
| 2015/0372548 A1* | 12/2015 | Nigo | H02K 1/2773 310/156.01 |
| 2017/0141653 A1 | 5/2017 | Okazaki et al. | |

FOREIGN PATENT DOCUMENTS

| | | |
|---|---|---|
| JP | 2005-094929 A | 4/2005 |
| JP | 2005-354817 A | 12/2005 |
| JP | 2008-228442 A | 9/2008 |
| JP | 2009-038843 A | 2/2009 |
| JP | 2009-050098 A | 3/2009 |
| JP | 2011109834 A * | 6/2011 |
| JP | 2012-228040 A | 11/2012 |
| JP | 2014-155347 A | 8/2014 |
| JP | 2017-041979 A | 2/2017 |
| WO | 2015/198961 A1 | 12/2015 |

OTHER PUBLICATIONS

Office Action dated May 19, 2020 issued in corresponding JP patent application No. 2019-516787 (and English translation).
Office Action dated Aug. 25, 2020 issued in corresponding JP patent application No. 2019-516787 (and English translation).
Office Action dated Nov. 27, 2020 issued in corresponding CN patent application No. 201780089723.5 (and English machine translation).
International Search Report of the International Searching Authority dated Aug. 1, 2017 for the corresponding international application No. PCT/JP2017/017652 (and English translation).
Office Action dated Jun. 2, 2021 issued in corresponding CN patent application No. 201780089723.5 (and English machine translation).

* cited by examiner

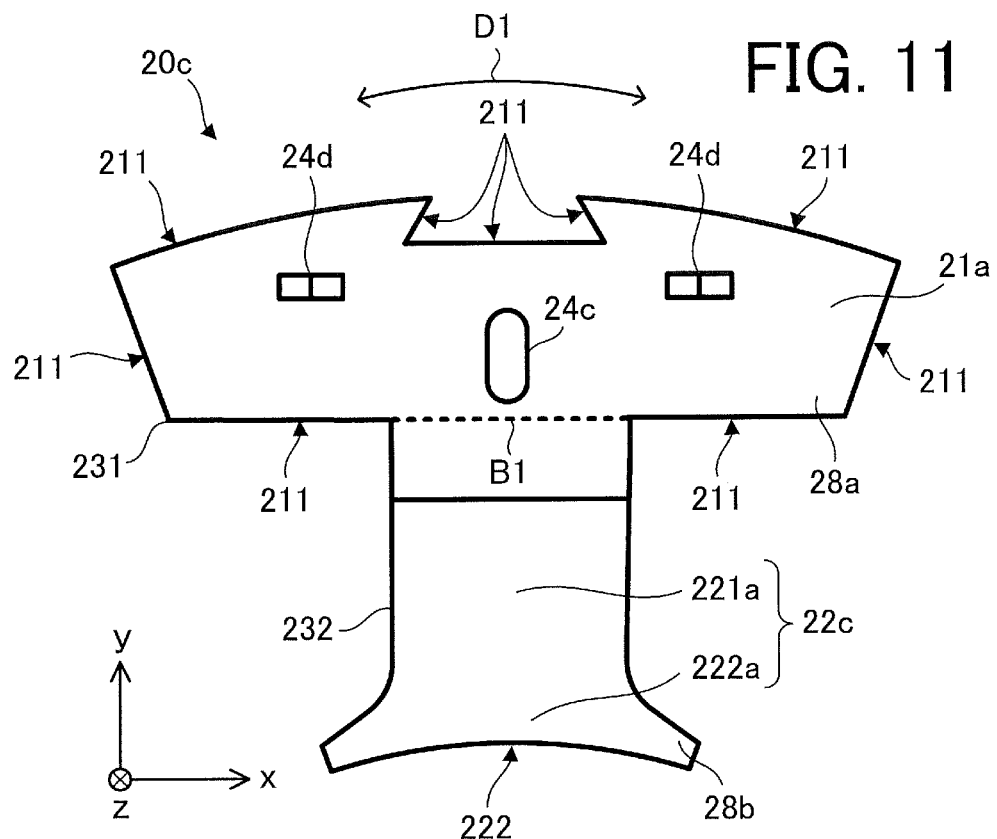
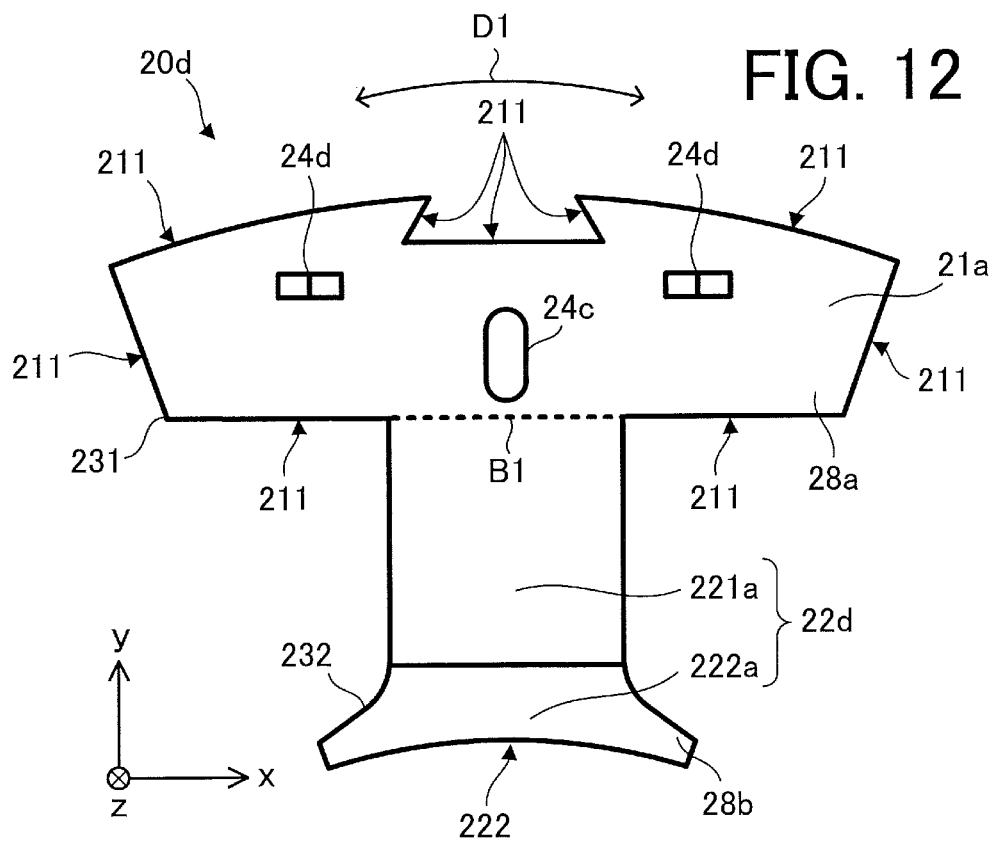

STATOR, ELECTRIC MOTOR, COMPRESSOR, REFRIGERATING AND AIR CONDITIONING APPARATUS, AND METHOD FOR MANUFACTURING STATOR

CROSS REFERENCE TO RELATED APPLICATION

This application is a U.S. national stage application of International Patent Application No. PCT/JP2017/017652 filed on May 10, 2017, the disclosure of which is incorporated herein by reference.

TECHNICAL FIELD

The present invention relates to a stator for an electric motor.

BACKGROUND

An electric motor such as an interior permanent magnet motor including a rotor and a stator is generally used. In the interior permanent magnet motor, magnetic flux from the rotor flows into the distal end of a tooth portion in the radial direction to form a magnetic circuit. Accordingly, the tooth portion contributes to the efficiency of the electric motor more than a yoke portion. The stator is formed of a plurality of sheets such as electrical steel sheets stacked in the axial direction of the axis of rotation of the rotor. It is a common practice to form the sheet such as an electrical steel sheet using press working (more specifically, blanking) from the viewpoint of cost and ease of machining (see, for example, patent reference 1).

PATENT REFERENCE

Patent Reference 1: Japanese Patent Application Publication No. 2008-228442

When, however, the sheet is formed by press working, the contour of the sheet exhibits a fracture surface. In this case, since a shear stress has occurred on the fracture surface due to factors associated with press working, the magnetic characteristics of the sheet have degraded. In the stator, especially the tooth portion contributes to the efficiency of the electric motor more than the yoke portion. To enhance the efficiency of the electric motor, therefore, it is desired to improve the magnetic characteristics of the tooth portion.

SUMMARY

It is an object of the present invention to enhance efficiency of an electric motor.

In accordance with an aspect of the present invention, a stator includes a yoke portion, and a tooth portion located inside the yoke portion in a radial direction, wherein at least a part of an inner surface of the tooth portion in the radial direction is a surface formed by etching, and a fracture surface ratio of the inner surface is lower than a fracture surface ratio of a side surface of the yoke portion.

In accordance with another aspect of the present invention, a stator includes a yoke portion, and a tooth portion located inside the yoke portion in a radial direction, wherein a fracture surface ratio of an inner surface of the tooth portion in the radial direction is lower than a fracture surface ratio of side surfaces of the yoke portion, the fracture surface ratio of the inner surface is a ratio of an area of a fracture surface formed on the inner surface to a total area of a distal end of the tooth part, and the fracture surface ratio of the side surfaces of the yoke portion is a ratio of an area of a fracture surface formed on the side surfaces to a total area of the side surfaces.

According to the present invention, efficiency of an electric motor can be enhanced.

BRIEF DESCRIPTION OF THE DRAWINGS

FIG. 11 is a plan view schematically illustrating the structure of a divided stator core of a stator according to Modification 2.

FIG. 12 is a plan view schematically illustrating the structure of a divided stator core of a stator according to Modification 3.

DETAILED DESCRIPTION

Embodiment 1

Figure 1:
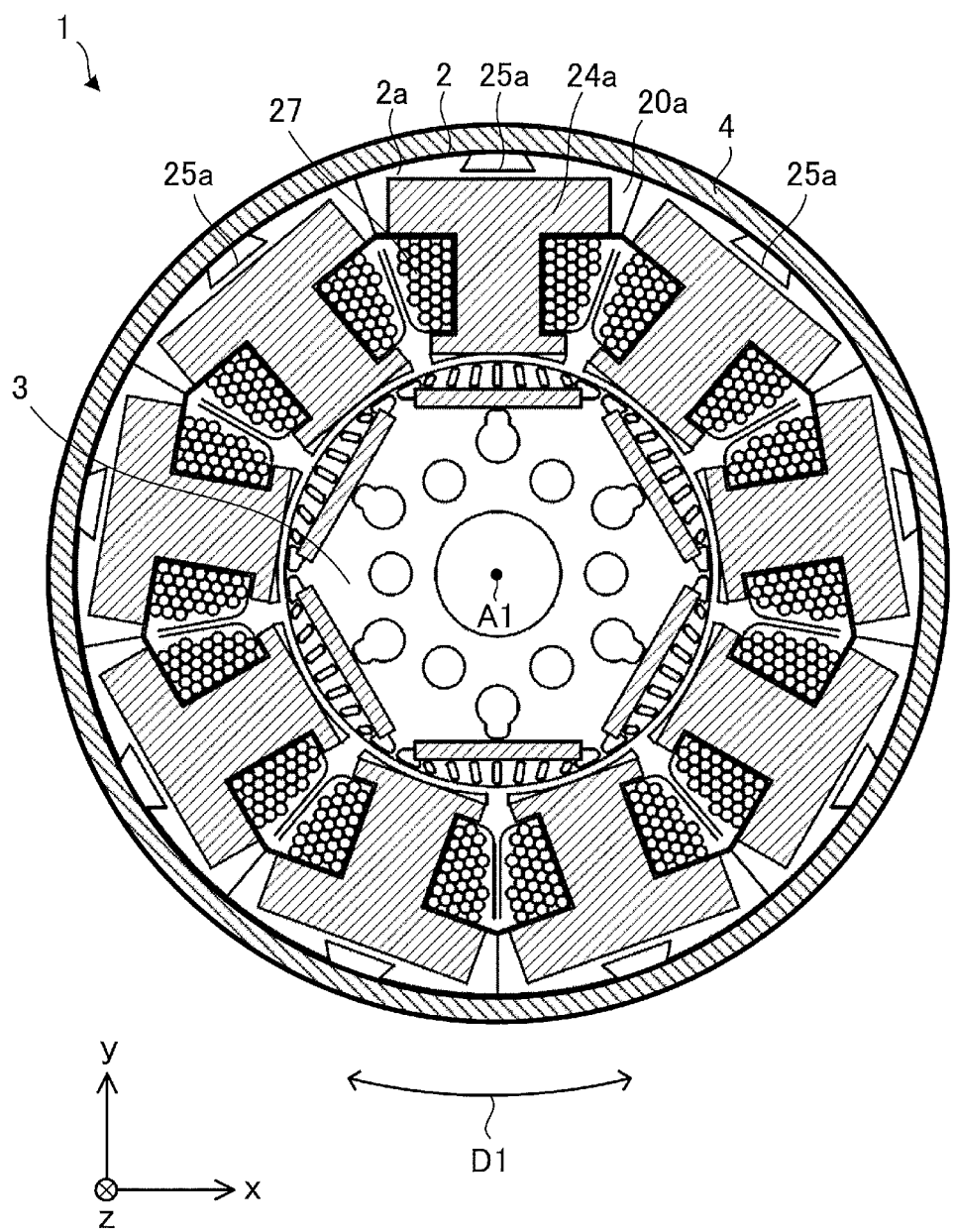
FIG. 1 is a sectional view schematically illustrating the internal structure of an electric motor including a stator according to Embodiment 1 of the present invention.

FIG. 1 is a sectional view schematically illustrating the internal structure of an electric motor 1 including a stator 2 according to Embodiment 1 of the present invention.

An arrow D1 indicates the direction (to be referred to as the "circumferential direction" hereinafter) along the outer circumference of each of the stator 2, a stator core 2a, and a rotor 3. In an x-y-z orthogonal coordinate system illustrated in each drawing, the z-direction (z-axis) indicates a direction (to be referred to as the "axial direction" hereinafter) parallel to an axis A1 (that is, the center of rotation of the rotor 3) of a shaft (a shaft 32; to be described later) of the electric motor 1, the x-direction (x-axis) indicates a direction perpendicular to the z-direction, and the y-direction (y-axis) indicates a direction perpendicular to both the z- and x-directions.

The electric motor 1 includes the stator 2 and the rotor 3. In the example illustrated in FIG. 1, the electric motor 1 further includes a frame 4 (also called a housing, a shell, or a motor frame). The electric motor 1 is designed as, for example, an interior permanent magnet motor.

The stator 2 includes a stator core 2a formed in an annular shape, and windings 27 wound around the stator core 2a. The stator 2 is formed in an annular shape in the circumferential direction about the axis A1 (that is, the center of rotation of the rotor 3). The rotor 3 is rotatably provided inside the stator 2. A 0.3- to 1-mm air gap is formed between the inner surface of the stator 2 and the outer surface of the rotor 3. When a current is supplied from an inverter to the windings 27 of the stator 2, the rotor 3 rotates. The current supplied to the windings 27 has its frequency synchronized with a commanded rotation speed.

The stator 2 (more specifically, the stator core 2a) is held by the frame 4. For example, the stator 2 (more specifically, the stator core 2a) is fixed to the frame 4 by press fitting or shrinkage fitting.

The stator 2 includes a plurality of divided core portions 25a. In the example illustrated in FIG. 1, the plurality of divided core portions 25a are arranged in an annular shape in the circumferential direction about the axis A1 to form the stator 2.

Figure 2:
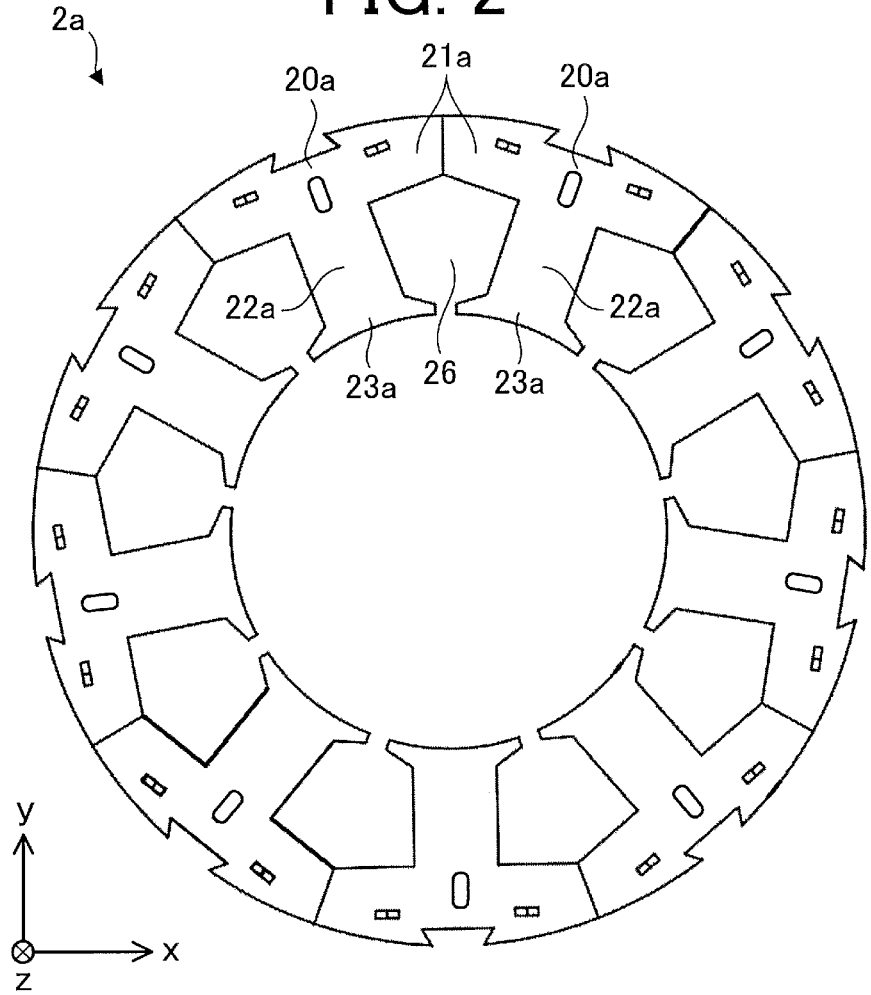
FIG. 2 is a plan view schematically illustrating the structure of a stator core.

FIG. 2 is a plan view schematically illustrating the structure of the stator core 2a.

The stator core 2a includes at least one yoke portion 21a and at least one tooth portion 22a. The stator core 2a is formed of a plurality of stator cores 20a divided (to be also referred to as the "divided stator cores 20a" hereinafter). Therefore, each divided stator core 20a includes the yoke portion 21a and the tooth portion 22a.

Note, however, that the stator 2 need not always be formed of the plurality of divided stator cores 20a. The stator core 2a may be formed by, for example, stacking a plurality of annular materials (for example, electrical steel sheets or amorphous materials such as amorphous metals).

In the stator core 2a, the yoke portion 21a of one divided stator core 20a is connected to the yoke portion 21a of another divided stator core 20a adjacent to the former, as illustrated in FIG. 2. A region surrounded by the two yoke portions 21a and the two tooth portions 22a serves as a slot portion 26.

A plurality of slot portions 26 are equidistantly formed in the circumferential direction. In the example illustrated in FIG. 2, nine slot portions 26 are formed in the stator core 2a.

The stator core 2a includes a plurality of tooth portions 22a, which are adjacent to each other with the slot portions 26 in between, as illustrated in FIG. 2. Therefore, the plurality of tooth portions 22a and the plurality of slot portions 26 are alternately arranged in the circumferential direction. The arrangement pitches of the plurality of tooth portions 22a in the circumferential direction (that is, the widths of the slot portions 26 in the circumferential direction) are equal.

Figure 3:
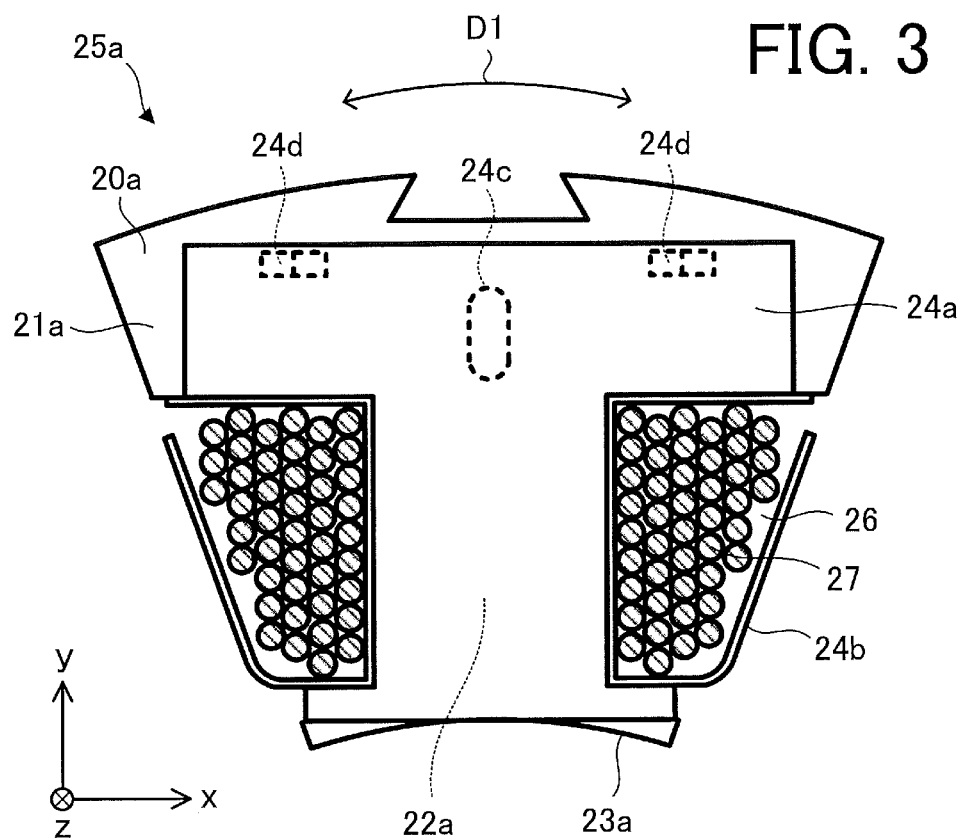
FIG. 3 is a sectional view schematically illustrating the structure of a divided core portion.

FIG. 3 is a sectional view schematically illustrating the structure of the divided core portion 25a.

Each divided core portion 25a includes a yoke portion 21a, a tooth portion 22a located inside the yoke portion 21a in the radial direction, a winding 27, and insulators 24a and 24b insulating the stator core 2a. In this Embodiment, the yoke portion 21a and the tooth portion 22a are formed integrally, but a tooth portion 22a formed separately from the yoke portion 21a may be mounted on the yoke portion 21a.

The winding 27 is wound around the stator core 2a with the insulators 24a and 24b in between to form a coil for generating a rotating magnetic field. More specifically, the winding 27 is wound around the outer periphery of the tooth portion 22a.

The winding 27 is, for example, a magnet wire. For example, the stator 2 has three phases, and the winding 27 (that is, the coil) is connected in Y-connection (also called star connection). The number of turns and the wire diameter of the winding 27 are determined in accordance with, for example, the rotation speed, the torque, and the voltage specification of the electric motor 1, and the cross-sectional area of the slot portion 26. The wire diameter of the winding 27 is, for example, 1.0 mm. The winding 27 is wound around each tooth portion 22a of the stator core 2a by, for example, 80 turns. However, the wire diameter and the number of turns of the winding 27 are not limited to these examples.

As the winding scheme of the windings 27, concentrated winding is used. In, for example, a state before the divided stator cores 20a are arranged in an annular shape (for example, the state in which the divided stator cores 20a are arranged linearly), the windings 27 can be wound around the divided stator cores 20a. The divided stator cores 20a (that is, the divided core portions 25a) having the windings 27 wound around them are folded in an annular shape and fixed together by welding or the like.

Figure 4:
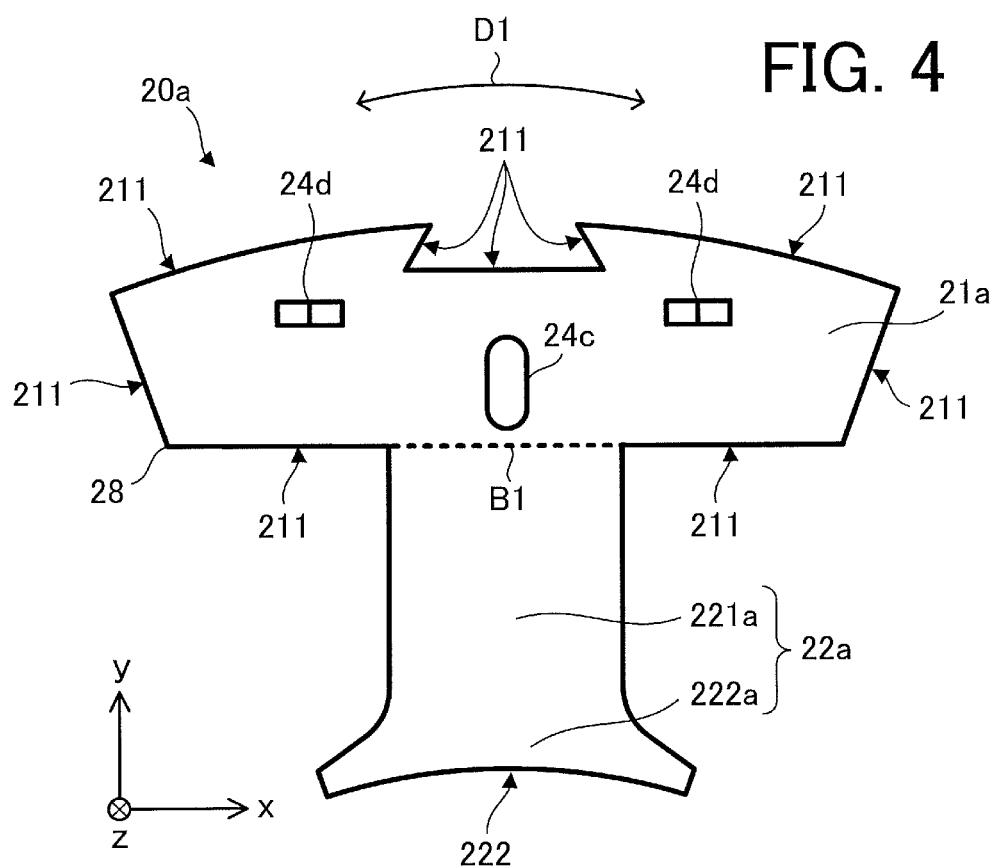
FIG. 4 is a plan view schematically illustrating the structure of a divided stator core.

FIG. 4 is a plan view schematically illustrating the structure of the divided stator core 20a.

Figure 5:
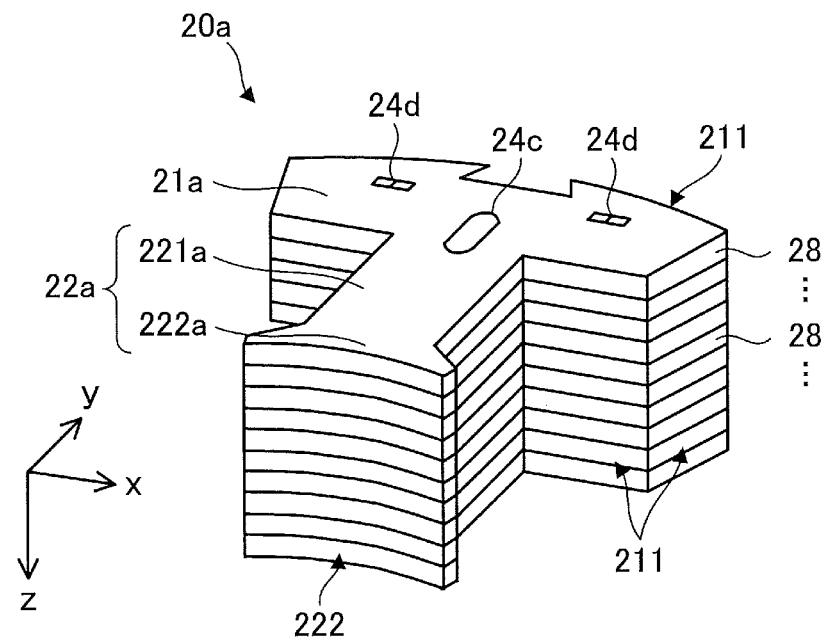
FIG. 5 is a perspective view schematically illustrating the structure of the divided stator core.

FIG. 5 is a perspective view schematically illustrating the structure of the divided stator core 20a.

The yoke portion 21a extends in the circumferential direction, and the tooth portion 22a extends inwards (in the −y-direction in FIG. 3) in the radial direction of the stator core 2a. In other words, the tooth portion 22a projects from the yoke portion 21a toward the axis A1. The tooth portion 22a includes a main body portion 221a and a tooth top portion 222a, as illustrated in FIGS. 4 and 5. The tooth top portion 222a is formed at the distal end of the tooth portion 22a (more specifically, the end of the main body portion 221a) in the radial direction. In the example illustrated in FIGS. 4 and 5, the main body portion 221a has a uniform width along the radial direction. The tooth top portion 222a extends in the circumferential direction, and is formed to stretch in the circumferential direction.

A fixing hole 24c to fix the insulator 24a is formed in the divided stator core 20a (for example, the yoke portion 21a), as illustrated in FIGS. 3 to 5.

The divided stator core 20a is formed of at least one sheet 28 (also called a plate). In this Embodiment, the divided stator core 20a is formed of a plurality of sheets 28 stacked in the axial direction (that is, the z-direction).

The sheets 28 are formed into a predetermined shape by press working (more specifically, blanking) first. The sheets 28 are, for example, electrical steel sheets. When electrical steel sheets are used as the sheets 28, the thickness of the sheet 28 is, for example, 0.01 mm to 0.7 mm. In this Embodiment, the thickness of the sheet 28 is 0.35 mm. One sheet 28 is fastened by caulking 24d to another sheet 28 adjacent to the former.

Generally, iron losses (that is, energy losses) such as a hysteresis loss and an eddy current loss occur in the stator core. The hysteresis loss is an energy loss caused when the magnetic domain of the stator core changes in magnetic field direction by an alternating magnetic field, and is theoretically proportional to the frequency of a change in magnetic flux occurring in the stator core. The eddy current loss is an energy loss caused by an eddy current generated in the stator core (for example, electrical steel sheets). Generally, an electric motor (for example, a brushless DC motor) controlled by an inverter is driven by high frequencies. Accordingly, the ratio of the eddy current loss to the iron loss occurring in the electric motor is higher than that of the hysteresis loss. The eddy current loss is theoretically proportional to the square of the frequency of a change in magnetic flux occurring in the stator core, and also proportional to the square of the thickness of each sheet (for example, each electrical steel sheet) of the stator core. To prevent an increase in iron loss, especially an increase in eddy current loss, therefore, it is effective to set the thicknesses of the sheets small.

The sheet 28 may be made of a material other than an electrical steel sheet and, for example, made of a nanocrystal material or an amorphous material such as an amorphous metal. When an amorphous material is used as the material of the sheet 28, the thickness of the amorphous material is about 3% to 15% of an electrical steel sheet. For example, an electrical steel sheet having a thickness of about 0.2 mm to 0.5 mm is used as the material of the sheet 28, while an amorphous material can be formed at a thickness of about 15 μm to 30 μm. Generally, since the eddy current loss gets lower in proportion to the square of the thickness of the sheet, the use of an amorphous material as the material of the sheet 28 makes it possible to prevent an increase in iron loss even if the electric motor 1 is operated at high frequencies.

When an amorphous material is used as the material of the sheet 28, the iron loss density in the stator core 2a can be kept low. In other words, the iron loss in the stator core 2a can be kept from increasing. For example, the iron loss density of an electrical steel sheet is 1.2 W/kg (for a magnetic flux density of 1.0 T at 50 Hz), while the iron loss density of an amorphous material is 0.05 W/kg (for a magnetic flux density of 1.0 T at 50 Hz). Accordingly, the iron loss density of the amorphous material is far lower than that of the electrical steel sheet.

Generally, an amorphous material such as an amorphous metal has hardness (for example, Vickers hardness) three to six times that of an electrical steel sheet, and therefore exhibits poor workability. For example, the Vickers hardness of an electrical steel sheet is about 187 GN/m$^3$, while the Vickers hardness of an amorphous material is about 900 GN/m$^3$. Thus, since the hardness of the amorphous material is high, when the amorphous material is machined by press working, a high shear stress occurs in the amorphous material. When a high shear stress occurs in the amorphous material, the magnetic characteristics of the amorphous material significantly degrade. Again, since the hardness of the amorphous material is high, when the amorphous material is machined by press working, a working tool severely wears, and this increases the maintenance frequency (time) and the maintenance cost. For this reason, as a high hardness material such as an amorphous material, etching is more suitable than press working in terms of both magnetic characteristics and manufacture.

A broken line B1 illustrated in FIG. 4 represents the boundary between the yoke portion 21a and the tooth portion 22a. In this case, the fracture surface ratio of a tooth end surface 222, that is, the inner surface of the tooth portion 22a in the radial direction, is lower than the fracture surface ratio of side surfaces 211 of the yoke portion 21a.

The tooth end surface 222 is the distal end of the tooth portion 22a and, more specifically, a portion, facing the rotor 3, of the tooth portion 22a. The fracture surface ratio of the tooth end surface 222 means the ratio of the area of a fracture surface formed on the tooth end surface 222 to the total area of the tooth end surface 222, in the divided stator core 20a.

The side surfaces 211 of the yoke portion 21a are portions, other than the two end surfaces in the axial direction, of the outer surfaces of the yoke portion 21a. The fracture surface ratio of the side surfaces 211 of the yoke portion 21a means the ratio of the area of fracture surfaces formed on the side surfaces 211 of the yoke portion 21a to the total area of the side surfaces 211, in the divided stator core 20a.

The fracture surface means a surface formed by brittle fracture. In this Embodiment, the fracture surface is formed when the sheets 28 are machined using press working (more specifically, blanking).

In the stator 2, since magnetic flux concentrates more on the tooth portion 22a than on the yoke portion 21a, the tooth portion 22a is desirably etched. Accordingly, the magnetic characteristics of the etched portion is improved. In other words, the iron loss of the etched portion is reduced. Magnetic flux from the rotor 3 flows from the tooth end surface 222 and the tooth top portion 222a into the tooth portion 22a (that is, the main body portion 221a). Therefore, since the magnetic flux concentrates on the tooth top portion 222a, especially on the tooth end surface 222, the tooth top portion 222a and the tooth end surface 222 are desirably etched.

In this Embodiment, at least a part of the tooth end surface 222 is a surface formed by etching. The entire tooth end surface 222 is desirably formed by etching. For example, after the sheets 28 are machined by blanking into a shape illustrated in FIG. 4, the tooth end surface 222 is formed by etching. A corrosion surface is formed by etching. More specifically, portions, other than the tooth end surface 222, of the sheets 28 are formed by blanking, and the etched tooth end surface 222 is formed of a corrosion surface. Accordingly, the fracture surface ratio of the tooth end surface 222 is lower than the fracture surface ratio of the side surfaces 211 of the yoke portion 21a. This improves the magnetic characteristics of the tooth end surface 222.

During rotation of the rotor 3, a magnetic field is formed so that magnetic flux concentrates on the upstream side of the tooth portion 22a in the rotation direction of the rotor 3. Therefore, etching is desirably performed on the upstream side of the tooth portion 22a in the rotation direction of the rotor 3. In this case, the side surface of the tooth portion 22a (for example, the side surface of the main body portion 221a and the side surface of the tooth top portion 222a) on the upstream side in the rotation direction of the rotor 3 is desirably etched.

Upon etching, the dislocation density of the etched portion lowers. Accordingly, the dislocation density of the tooth end surface 222 of the tooth portion 22a is lower than the dislocation density of the side surfaces 211 of the yoke portion 21a. This improves the magnetic characteristics of the etched portion.

The yoke portion 21a may even be formed by press working. The magnetic characteristics of the side surfaces 211 of the yoke portion 21a degrade due to press working, but the yoke portion 21a contributes to the efficiency of the electric motor 1 less than the tooth portion 22a. Therefore, the use of press working makes it possible to machine the yoke portion 21a more easily and to keep the manufacturing cost less than when the sheets 28 are machined using only etching.

Figure 6:
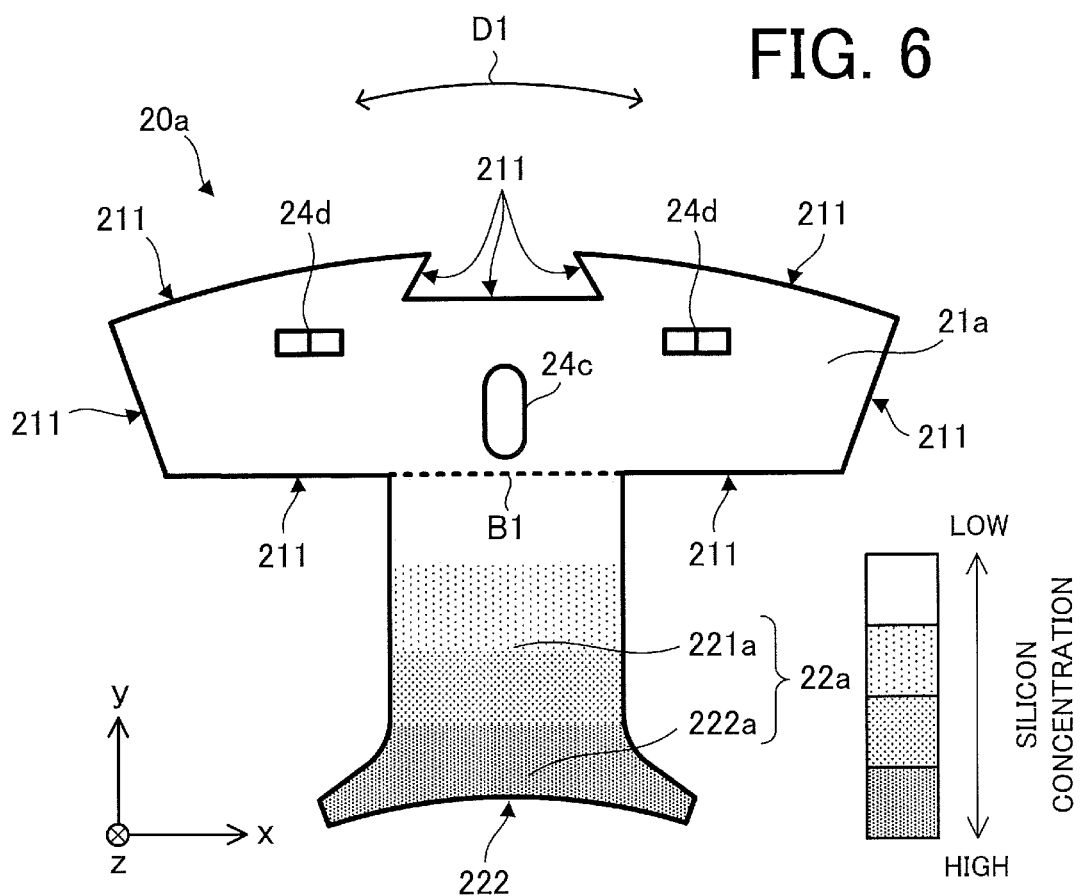
FIG. 6 is a view illustrating another example of the divided stator core.

FIG. 6 is a view illustrating another example of the divided stator core 20a.

The divided stator core 20a may partially vary in composition. For example, in the divided stator core 20a, the silicon concentration of the tooth portion 22a may be higher than that of the yoke portion 21a. In this case, the tooth portion 22a contains more silicon than the yoke portion 21a. In addition, in the tooth portion 22a, desirably, the more the position lies to the inside in the radial direction, the higher the silicon concentration, as illustrated in FIG. 6. In the divided stator core 20a, increasing the silicon concentration makes it possible to reduce the iron loss. In a portion having a highest silicon concentration, this concentration is 6%. In the example illustrated in FIG. 6, the silicon concentrations of the tooth top portion 222a and the tooth end surface 222 are 6%. A high silicon concentration portion has high hardness, and is therefore more suited to etching than to press working.

The Vickers hardness of the tooth portion 22a is higher than that of the yoke portion 21a. For example, a high silicon concentration portion has high Vickers hardness, as described above. Increasing the Vickers hardness makes it possible to reduce the iron loss and, in turn, to enhance the efficiency of the electric motor 1.

The structure of the rotor 3 will be described below.

Figure 7:
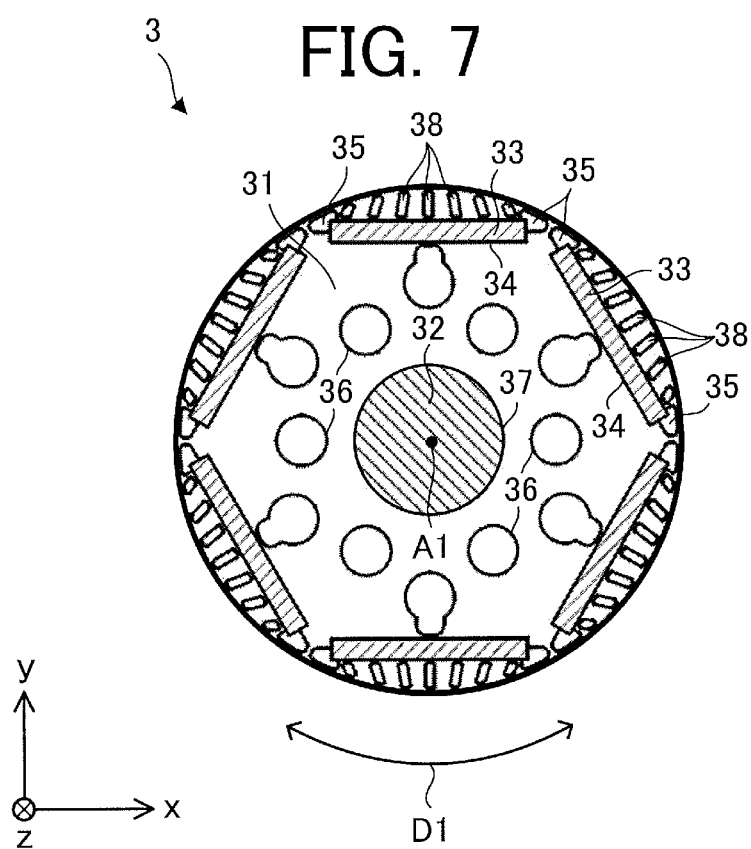
FIG. 7 is a sectional view schematically illustrating the structure of a rotor.

FIG. 7 is a sectional view schematically illustrating the structure of the rotor 3.

The rotor 3 includes a rotor core 31, a shaft 32, at least one permanent magnet 33, at least one magnet insertion hole 34, at least one flux barrier 35, at least one air hole 36, and at least one slit 38. The rotor 3 is rotatable about the axis A1. The rotor 3 is rotatably placed inside the stator 2 with the air gap in between. The axis A1 serves as the center of rotation of the rotor 3 and as the axis of the shaft 32.

In this Embodiment, the rotor 3 is designed as an interior permanent magnet rotor. A plurality of magnet insertion holes 34 are formed in the rotor core 31 in the circumferential direction of the rotor 3. The magnet insertion holes 34 serve as voids in which the permanent magnets 33 are inserted. One permanent magnet 33 is inserted in each magnet insertion hole 34. However, a plurality of permanent magnets 33 may be arranged in each magnet insertion hole 34. The permanent magnets 33 inserted in the magnet insertion holes 34 are magnetized in the radial direction of the rotor 3 (that is, a direction perpendicular to the axis A1). The number of magnet insertion holes 34 corresponds to the number of magnetic poles on the rotor 3. The positional relationships of the individual magnetic poles are uniform. In this Embodiment, the number of magnetic poles on the rotor 3 is 6. However, the number of magnetic poles on the rotor 3 need only be 2 or more.

The permanent magnet 33 uses, for example, a rare-earth magnet (to be referred to as an "Nd—Fe—B permanent magnet" hereinafter) containing neodymium (Nd), iron (Fe), and boron (B) as main ingredients.

The coercive force or coercivity of the Nd—Fe—B permanent magnet has the property of lowering depending on the temperature. When, for example, an electric motor using an Nd rare-earth magnet is used at high temperatures of 100° C. or more, as in a compressor, since the coercivity of the magnet deteriorates by about −0.5 to −0.6%/AK depending on the temperature, it is necessary to enhance the coercivity by adding Dy (dysprosium). The coercivity improves nearly in proportion to the Dy content. In a general compressor, since the upper limit of the ambient temperature of an electric motor is about 150° C., the electric motor is used in the range of temperature rise of about 130° C. with respect to 20° C. At, for example, a temperature coefficient of −0.5%/AK, the coercivity lowers by 65%.

Keeping demagnetization from occurring at the maximum load of the compressor requires a coercivity of about 1,100 to 1,500 A/m. To ensure the coercivity at an ambient temperature of 150° C., it is necessary to set the room temperature coercivity to about 1,800 to 2,300 A/m.

With no Dy being added to the Nd—Fe—B permanent magnet, the room temperature coercivity is about 1,800 A/m. To obtain a coercivity of about 2,300 kA/m, it is necessary to add about 2 wt % of Dy. Unfortunately, although adding Dy improves the coercivity characteristics, it degrades the residual magnetic flux density or remanence characteristics. When the remanence degrades, the magnet torque of the electric motor lowers, the supplied current increases, and the copper loss thus increases. It is, therefore, desired to keep the amount of added Dy less, in consideration of the efficiency of the electric motor.

The rotor core 31 is formed by stacking a plurality of electrical steel sheets. The thickness of each electrical steel sheet constituting the rotor core 31 is, for example, 0.1 mm to 0.7 mm. In this Embodiment, the thickness of each electrical steel sheet constituting the rotor core 31 is 0.35 mm. One electrical steel sheet of the rotor core 31 is fastened by caulking to another electrical steel sheet adjacent to the former.

At least one slit 38 is formed outside the magnet insertion hole 34 in the radial direction of the rotor 3. In this Embodiment, a plurality of slits 38 are formed outside the magnet insertion hole 34 in the radial direction of the rotor 3. Each slit 38 is elongated in the radial direction.

The shaft 32 is connected to the rotor core 31. The shaft 32 is fixed by, for example, shrinkage fitting or press fitting to a shaft hole 37 formed in the rotor core 31. With this arrangement, rotational energy generated by rotation of the rotor core 31 is transmitted to the shaft 32.

The flux barriers 35 are formed at positions adjacent to the magnet insertion holes 34 in the circumferential direction of the rotor 3. The flux barriers 35 reduce leakage magnetic flux. To prevent a short-circuit of the magnetic flux between adjacent magnetic poles, the distance between the flux barrier 35 and the outer surface (outer edge) of the rotor 3 is desirably small. The distance between the flux barrier 35 and the outer surface of the rotor 3 is, for example, 0.35 mm. The air holes 36 are designed as through holes. When, for example, the electric motor 1 is used for a compressor, a refrigerant can pass through the air holes 36.

A method for manufacturing a stator 2 according to Embodiment 1 will be described below.

Figure 8:
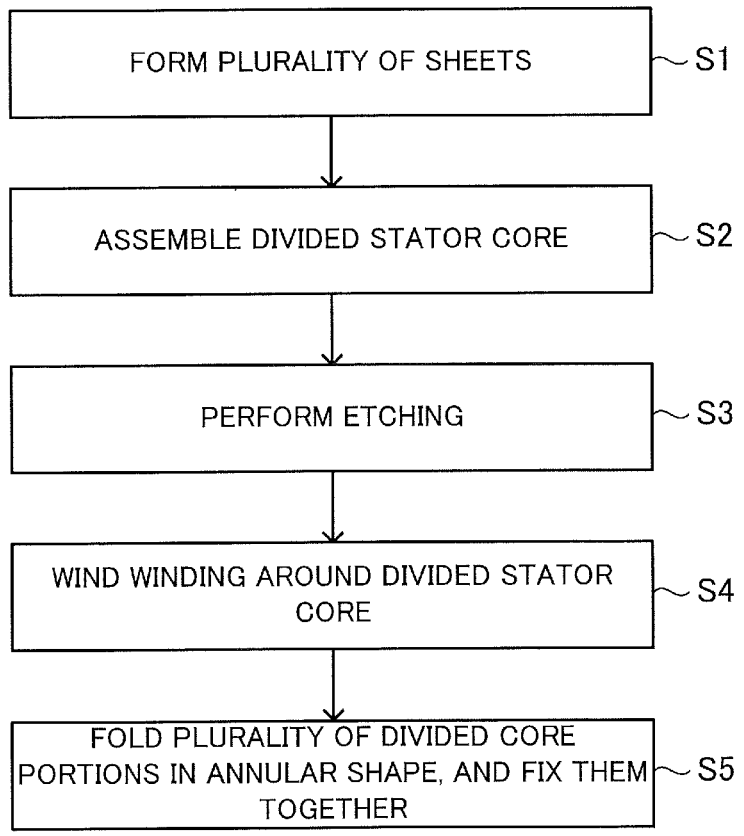
FIG. 8 is a flowchart illustrating an exemplary process of manufacturing a stator.

FIG. 8 is a flowchart illustrating an exemplary process of manufacturing a stator 2.

In step S1, the plurality of sheets 28 having a predetermined structure are formed. For example, the plurality of sheets 28 are formed into the shapes of the yoke portion 21a and the tooth portion 22a by press working (more specifically, blanking). However, the tooth portion 22a need not always be formed by press working. For, for example, the tooth portion 22a, etching may be used to form the plurality of sheets 28 into the shape of the tooth portion 22a. In this case, the yoke portion 21a and the tooth portion 22a may be formed in independent steps.

In step S2, the divided stator core 20a is assembled. More specifically, the divided stator core 20a is assembled by stacking the plurality of sheets 28 in the axial direction. The plurality of sheets 28 are stacked in the axial direction while, for example, being fastened together by caulking 24d. The plurality of sheets 28 may be fixed by a method (for example, an adhesive) other than the caulking 24d. When the electric motor 1 is used for a compressor, it is desired to use an adhesive resistant to heat and to a compressor refrigerant.

In step S3, etching is performed. More specifically, at least a part of the tooth end surface 222 of the tooth portion 22a is formed by etching so that the fracture surface ratio of the tooth end surface 222 of the tooth portion 22a is lower than the fracture surface ratio of the side surfaces 211 of the yoke portion 21a. The entire tooth end surface 222 is desirably formed by etching. Not only the tooth end surface 222, but also a portion including at least a part of the tooth top portion 222a may be etched. In this case, etching is desirably performed on the upstream side of the tooth portion 22a in the rotation direction of the rotor 3. The processes in steps S2 and S3 may be performed in reverse order.

In etching, a resist is applied onto the sheets 28, exposed to light, and developed to leave the resist in the shape of the sheets 28. Any unnecessary resist is removed. A fracture surface is removed by corroding only a portion (that is, the tooth end surface 222), which is not coated with the resist, using a corrosive chemical (more specifically, an etching solution). Etching is advantageous in terms of achieving a machining accuracy higher than that of press working, and generating no shear stress on a machined surface. Etching can prevent any shear stress, and, in turn, prevent degradation in magnetic characteristic, that is, deterioration in iron loss.

In step S4, the winding 27 is wound around the divided stator core 20a. The winding 27 can be wound by, for example, the flyer scheme using a winding machine. The process in step S4 is repeated to form the plurality of divided core portions 25a. When insulators 24a and 24b are used, they are combined with the divided stator core 20a before the winding 27 is wound. The winding 27 is wound around the divided stator core 20a equipped with the insulators 24a and 24b.

In step S5, the plurality of divided core portions 25a are folded in an annular shape and fixed together by welding or the like.

With the above-mentioned processes, the stator 2 can be manufactured. The above-mentioned method for manufacturing the stator 2 may be applied to the manufacture of stators according to other embodiments (to be described later).

The effects of the stator 2 according to Embodiment 1 will be described below.

In the electric motor 1, magnetic flux from the rotor 3 flows from the tooth end surface 222 and the tooth top portion 222a into the tooth portion 22a (that is, the main body portion 221a). Therefore, the magnetic characteristics of the tooth portion 22a, especially those of the tooth end surface 222 and the tooth top portion 222a, are directly relevant to the characteristics of the electric motor 1, and thus contribute to the characteristics of the electric motor 1 more than the magnetic characteristics of other portions in the electric motor 1. When the sheets 28 are formed by press working, a shear stress occurs in the sheets 28. When a shear stress occurs in the sheets 28, the magnetic characteristics of the sheets 28 degrade. In this Embodiment, the fracture surface ratio of the tooth end surface 222 is lower than the fracture surface ratio of the side surfaces 211 of the yoke portion 21a. This improves the magnetic characteristics of the tooth end surface 222. In other words, the iron loss of the tooth end surface 222 is reduced. As a result, the efficiency of the electric motor 1 can be enhanced.

In the divided stator core 20a, when the silicon concentration of the tooth portion 22a is higher than that of the yoke portion 21a, the iron loss can be kept less. As described above, the magnetic characteristics of the tooth end surface 222 and the tooth top portion 222a are directly relevant to the characteristics of the electric motor 1, and thus contribute to the characteristics of the electric motor 1 more than the magnetic characteristics of other portions in the electric motor 1. Accordingly, increasing the silicon concentrations of the tooth end surface 222 and the tooth top portion 222a makes it possible to reduce the iron loss and, in turn, to enhance the efficiency of the electric motor 1.

The electric motor 1 including the stator 2 according to Embodiment 1 has the above-mentioned effects. In the electric motor 1, furthermore, since the permanent magnets 33 are magnetized in the radial direction of the rotor 3 (that is, a direction perpendicular to the axis A1), magnetic flux from the rotor 3 readily concentrates on the tooth top portion 222a and the tooth end surface 222. This makes it possible to enhance the efficiency of the electric motor 1.

In the electric motor 1, at least one slit 38 is formed outside the magnet insertion hole 34 in the radial direction of the rotor 3. When the tooth end surface 222 is formed by etching, the portion formed by etching has fewer defects in its crystal structure than that formed by press working. Because of the fewer defects in the crystal structure, good magnetic characteristics are obtained, and especially the inductance (that is, the ease of passage of magnetic flux) thus improves. Generally, however, the higher the inductance, the stronger the magnetic attraction force produced by magnetic flux from the stator. This attraction force vibrates the rotor and therefore increases noise. In this Embodiment, since at least one slit 38 is formed outside the magnet insertion hole 34 in the radial direction of the rotor 3, the inductance in the circumferential direction (also called the q-axis) lowers. This weakens the above-mentioned attraction force, so that the vibration of the rotor 3 and the noise in the electric motor 1 can be dampened.

With the method for manufacturing a stator 2 according to Embodiment 1, the stator 2 having the above-mentioned effects can be manufactured.

In this Embodiment, furthermore, the use of etching in the process of manufacturing a stator 2 allows the fracture surface ratio of the tooth end surface 222 to be lower than the fracture surface ratio of the side surfaces 211 of the yoke portion 21a. This makes it possible to improve the magnetic characteristics of the tooth end surface 222.

Modification 1

Figure 9:
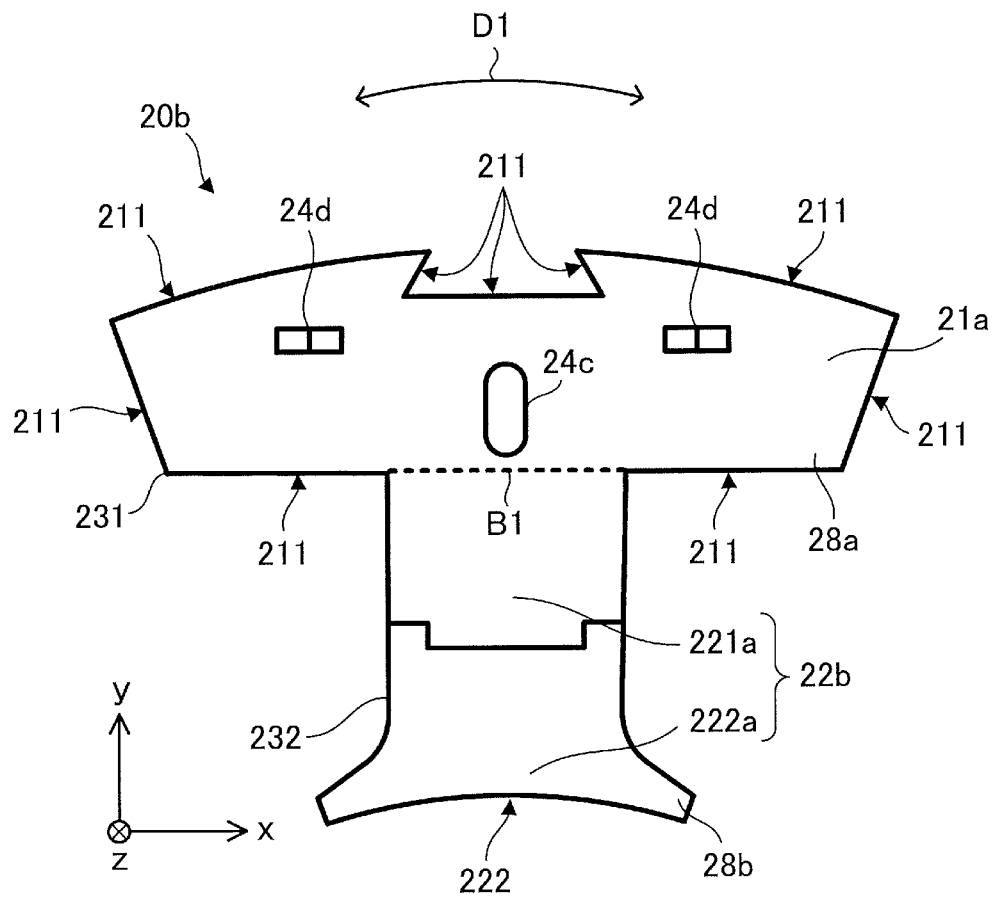
FIG. 9 is a plan view schematically illustrating the structure of a divided stator core of a stator according to Modification 1.

FIG. 9 is a plan view schematically illustrating the structure of a divided stator core 20b of a stator according to Modification 1.

Figure 10:
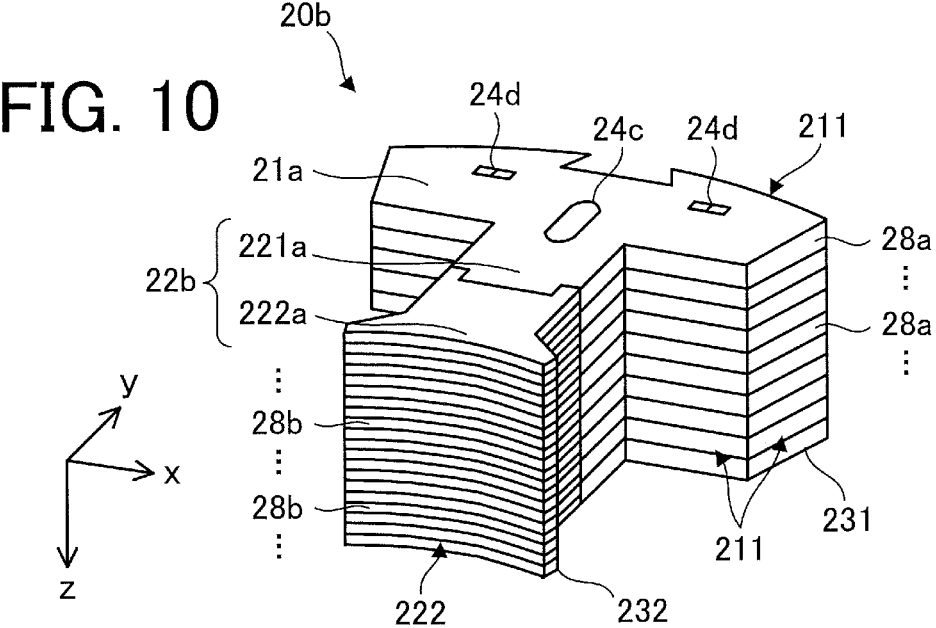
FIG. 10 is a perspective view schematically illustrating the structure of the divided stator core of the stator according to Modification 1.

FIG. 10 is a perspective view schematically illustrating the structure of the divided stator core 20b of the stator according to Modification 1.

The divided stator core 20b of the stator according to Modification 1 includes a tooth portion 22b having a structure different from that of the tooth portion 22a of the divided stator core 20a of the stator 2 according to Embodiment 1, and is the same as in Embodiment 1 in other respects. The divided stator core 20b is applicable to the stator 2 according to Embodiment 1 in place of the divided stator core 20a.

In the divided stator core 20b, a yoke portion 21a includes at least one first sheet 28a, and the tooth portion 22b includes at least one second sheet 28b. In the example illustrated in FIG. 10, a plurality of first sheets 28a are stacked in the axial direction, and a plurality of second sheets 28b are also stacked in the axial direction. A broken line B1 illustrated in FIG. 9 represents the boundary between the yoke portion 21a and the tooth portion 22b. Therefore, the tooth portion 22b (more specifically, a main body portion 221a) includes parts of the first sheets 28a, and the second sheets 28b. A tooth top portion 222a is formed of the second sheets 28b.

The divided stator core 20b is separated into a first portion 231 and a second portion 232. In the divided stator core 20b, a portion formed of the first sheets 28a is defined as the first portion 231. In the divided stator core 20b, a portion formed of the second sheets 28b is defined as the second portion 232. The first portion 231 includes the yoke portion 21a, and a part of the tooth portion 22b. The second portion 232 is a part of the tooth portion 22b.

The second sheets 28b (that is, the second portion 232) are mounted at the inner ends of the first sheets 28a (that is, the first portion 231) in the radial direction. For example, the second sheets 28b are fixed to the first sheets 28a by an adhesive.

The materials of the first sheet 28a and the second sheet 28b are different from each other. For example, the first sheet 28a is made of an electrical steel sheet, and the second sheet 28b is made of a nanocrystal material or an amorphous material such as an amorphous metal.

The second sheet 28b is thinner than the first sheet 28a. When an electrical steel sheet is used as the first sheet 28a, the thickness of the first sheet 28a is 0.20 mm to 0.50 mm. When an amorphous material is used as the second sheet 28b, the thickness of the second sheet 28b is 10 µm to 100 µm. A material as thin as the 10- to 100-µm-thick second sheet 28b produces a considerable effect of reducing the iron loss.

The stator according to Modification 1 can be manufactured in the same processes as the processes (FIG. 8) in the method for manufacturing a stator 2 according to Embodiment 1. For example, in step S1 illustrated in FIG. 8, a plurality of first sheets 28a and a plurality of second sheets 28b are formed to have predetermined structures by blanking. When an amorphous material is used as the second sheet 28b, a plurality of second sheets 28b may be formed to have a predetermined structure by etching instead of press working, in consideration of the ease of machining.

In step S2, a divided stator core 20b is assembled. More specifically, a first portion 231 is assembled by stacking the plurality of first sheets 28a in the axial direction. The plurality of first sheets 28a are stacked in the axial direction while, for example, being fastened together by caulking 24d. A second portion 232 is further assembled by stacking the second sheets 28b in the axial direction. The plurality of second sheets 28b are, for example, bonded together by an adhesive and stacked in the axial direction. The second portion 232 is attached to the first portion 231. The second portion 232 is fixed to the first portion 231 by, for example, an adhesive. The processes subsequent to step S2 are the same as the above-mentioned processes in steps S3 to S5.

The stator according to Modification 1 has the same effects as those of the stator 2 according to Embodiment 1.

In Modification 1, furthermore, the tooth end surface 222 and the tooth top portion 222a are formed of the second sheets 28b (that is, the second portion 232). Therefore, a material (for example, an amorphous material) excellent in magnetic characteristic can be used for a portion (for example, the second portion 232) greatly affecting the characteristics of the electric motor 1 (for example, the efficiency of the electric motor). In particular, a material as thin as the 10- to 100-µm-thick second sheet 28b produces a considerable effect of reducing the iron loss. This makes it possible to reduce the iron loss in the second portion 232. An electrical steel sheet that is an inexpensive material can be used for a portion (for example, the first portion 231) having a small effect on the characteristics of the electric motor 1 (for example, the efficiency of the electric motor). As a result, the efficiency of the electric motor 1 can be enhanced, and the rise in cost of the electric motor 1 (more specifically, the stator) can be curbed.

Modification 2

FIG. 11 is a plan view schematically illustrating the structure of a divided stator core 20c of a stator according to Modification 2.

The divided stator core 20c of the stator according to Modification 2 includes a tooth portion 22c having a structure different from those of the tooth portion 22a of the divided stator core 20a of the stator 2 according to Embodiment 1 and the tooth portion 22b in Modification 1.

In the divided stator core 20c, a first portion 231 includes a flat portion in contact with a second portion 232, and the second portion 232 includes a flat portion in contact with the first portion 231.

Other structures in the divided stator core 20c are the same as those in the divided stator core 20b described in Modification 1. The divided stator core 20c is applicable to the stator 2 according to Embodiment 1 in place of the divided stator core 20a.

The stator according to Modification 2 has the same effects as those of the stator according to Modification 1.

Modification 3

FIG. 12 is a plan view schematically illustrating the structure of a divided stator core 20d of a stator according to Modification 3.

The divided stator core 20d of the stator according to Modification 3 includes a tooth portion 22d having a structure different from those of the tooth portion 22a of the divided stator core 20a of the stator 2 according to Embodiment 1 and the tooth portion 22b in Modification 1.

In the divided stator core 20d, a first portion 231 includes a yoke portion 21a, and a main body portion 221a of the tooth portion 22d, and a second portion 232 is a tooth top portion 222a of the tooth portion 22d.

Other structures in the divided stator core 20d are the same as those in the divided stator core 20b described in Modification 1. The divided stator core 20d is applicable to the stator 2 according to Embodiment 1 in place of the divided stator core 20a.

The stator according to Modification 3 has the same effects as those of the stator according to Modification 1.

Modification 4

Figure 13:
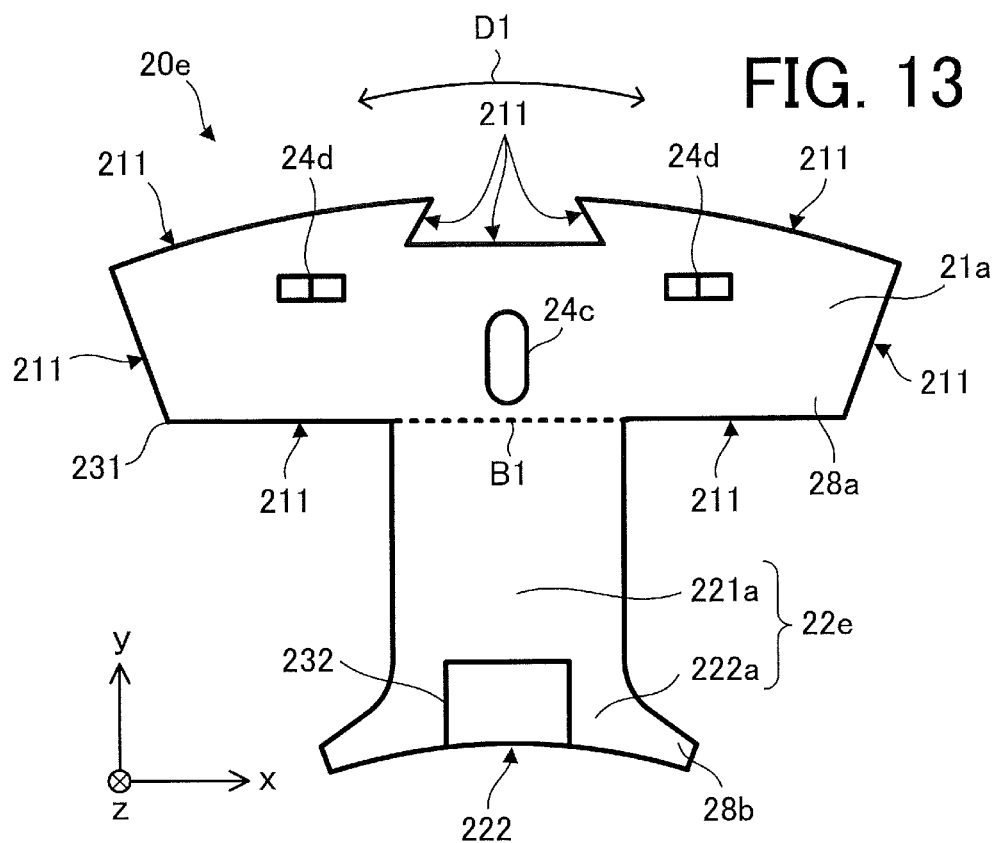
FIG. 13 is a plan view schematically illustrating the structure of a divided stator core of a stator according to Modification 4.

FIG. 13 is a plan view schematically illustrating the structure of a divided stator core 20e of a stator according to Modification 4.

The divided stator core 20e of the stator according to Modification 4 includes a tooth portion 22e having a structure different from those of the tooth portion 22a of the divided stator core 20a of the stator 2 according to Embodiment 1 and the tooth portion 22b in Modification 1.

In the divided stator core 20e, a first portion 231 includes a yoke portion 21a, a main body portion 221a of the tooth portion 22e, and a part of a tooth top portion 222a of the tooth portion 22e, and a second portion 232 includes a part of the tooth top portion 222a of the tooth portion 22e. Therefore, the first portion 231 includes a part of a tooth end surface 222, and the second portion 232 includes a part of the tooth end surface 222. The second portion 232 may include the main body portion 221a of the tooth portion 22e.

Other structures in the divided stator core 20e are the same as those in the divided stator core 20b described in Modification 1. The divided stator core 20e is applicable to the stator 2 according to Embodiment 1 in place of the divided stator core 20a.

The stator according to Modification 4 has the same effects as those of the stator according to Modification 1.

Modification 5

Figure 14:
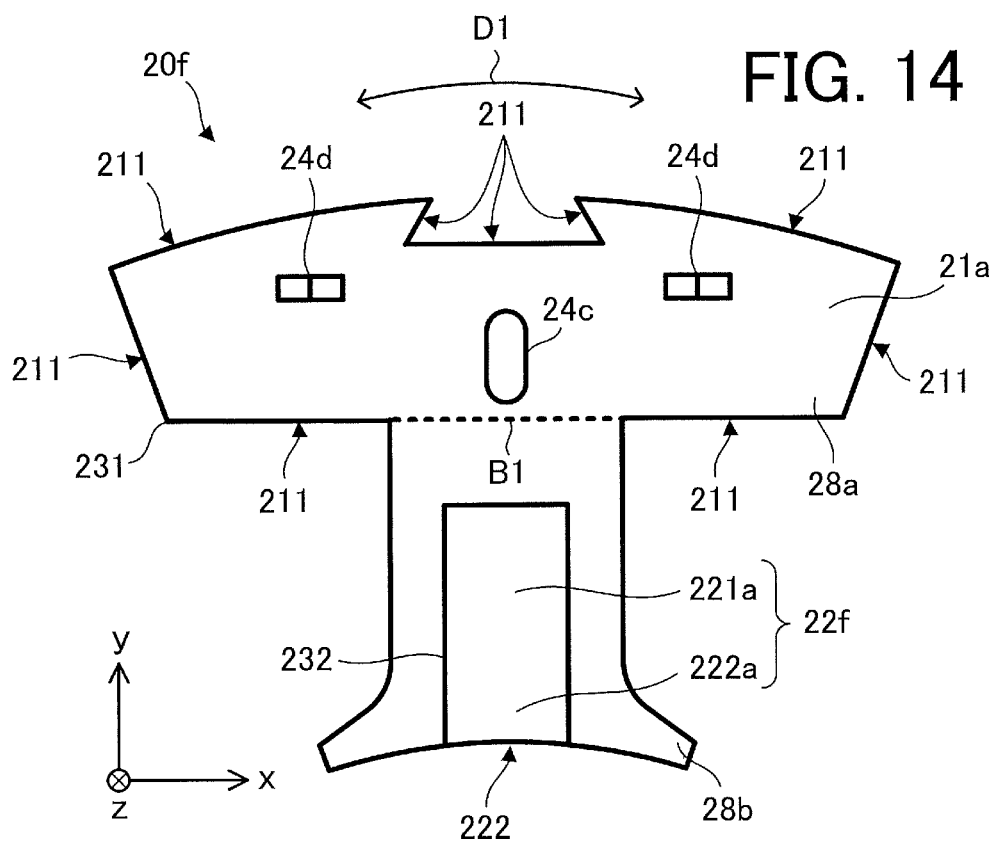
FIG. 14 is a plan view schematically illustrating the structure of a divided stator core of a stator according to Modification 5.

FIG. 14 is a plan view schematically illustrating the structure of a divided stator core 20f of a stator according to Modification 5.

The divided stator core 20f of the stator according to Modification 5 includes a tooth portion 22f having a structure different from those of the tooth portion 22a of the divided stator core 20a of the stator 2 according to Embodiment 1 and the tooth portion 22b in Modification 1.

In the divided stator core 20f, a second portion 232 is longer in the radial direction than the second portion 232 in Modification 4. A first portion 231 includes a yoke portion 21a, a part of a main body portion 221a of the tooth portion 22f, and a part of a tooth top portion 222a of the tooth portion 22f, and the second portion 232 includes a part of the main body portion 221a of the tooth portion 22f, and a part of the tooth top portion 222a of the tooth portion 22f. Therefore, the first portion 231 includes a part of a tooth end surface 222, and the second portion 232 includes a part of the tooth end surface 222.

Other structures in the divided stator core 20f are the same as those in the divided stator core 20b described in Modification 1. The divided stator core 20f is applicable to the stator 2 according to Embodiment 1 in place of the divided stator core 20a.

The stator according to Modification 5 has the same effects as those of the stator according to Modification 1.

Modification 6

Figure 15:
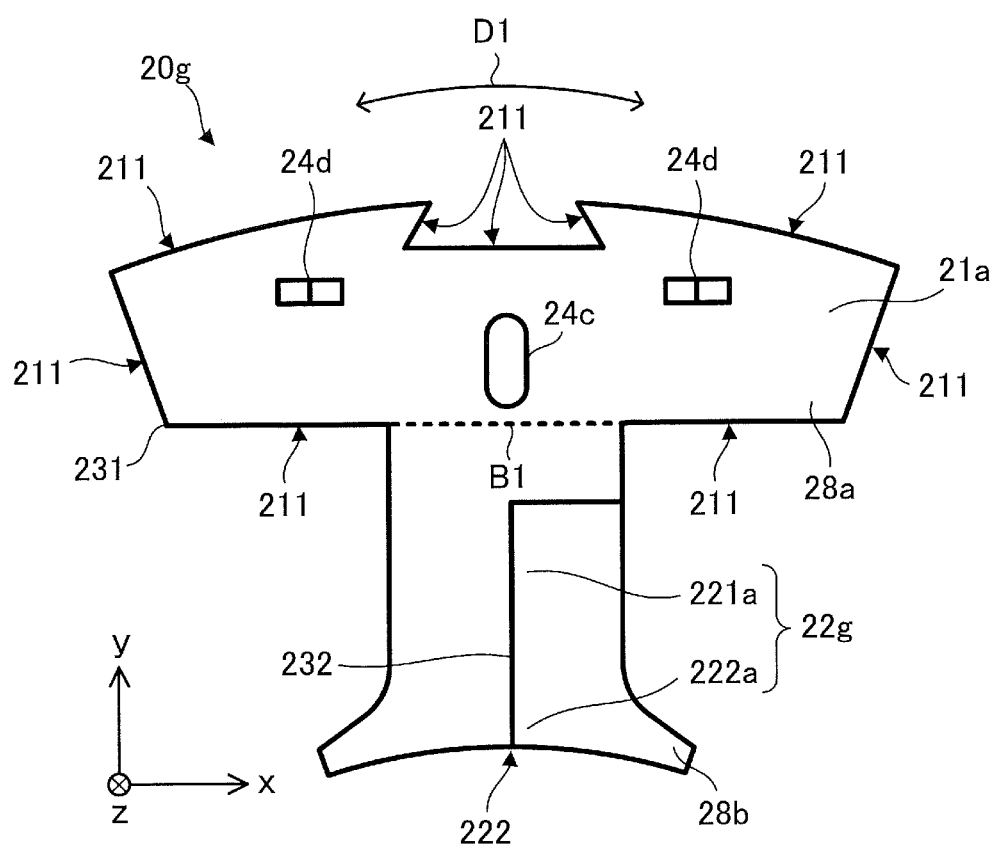
FIG. 15 is a plan view schematically illustrating the structure of a divided stator core of a stator according to Modification 6.

FIG. 15 is a plan view schematically illustrating the structure of a divided stator core 20g of a stator according to Modification 6.

The divided stator core 20g of the stator according to Modification 6 includes a tooth portion 22g having a structure different from those of the tooth portion 22a of the divided stator core 20a of the stator 2 according to Embodiment 1 and the tooth portion 22b in Modification 1.

In the divided stator core 20g, a second portion 232 is located on the upstream side in the rotation direction of a rotor 3. A first portion 231 includes a yoke portion 21a, a part of a main body portion 221a of the tooth portion 22g, and a part of a tooth top portion 222a of the tooth portion 22g, and the second portion 232 includes a part of the main body portion 221a of the tooth portion 22g, and a part of the tooth top portion 222a of the tooth portion 22g. Therefore, the first portion 231 includes a part of a tooth end surface 222, and the second portion 232 includes a part of the tooth end surface 222.

Other structures in the divided stator core 20g are the same as those in the divided stator core 20b described in Modification 1. The divided stator core 20g is applicable to the stator 2 according to Embodiment 1 in place of the divided stator core 20a.

The stator according to Modification 6 has the same effects as those of the stator according to Modification 1.

During rotation of the rotor 3, magnetic flux concentrates on the upstream side of the tooth portion 22a in the rotation direction of the rotor 3. Therefore, in the stator according to Modification 6, since the second portion 232 is located on the upstream side in the rotation direction of the rotor 3, the iron loss can be more effectively kept from increasing, and the efficiency of the electric motor 1 can thus be enhanced.

Embodiment 2

A compressor 6 according to Embodiment 2 of the present invention will be described below.

Figure 16:
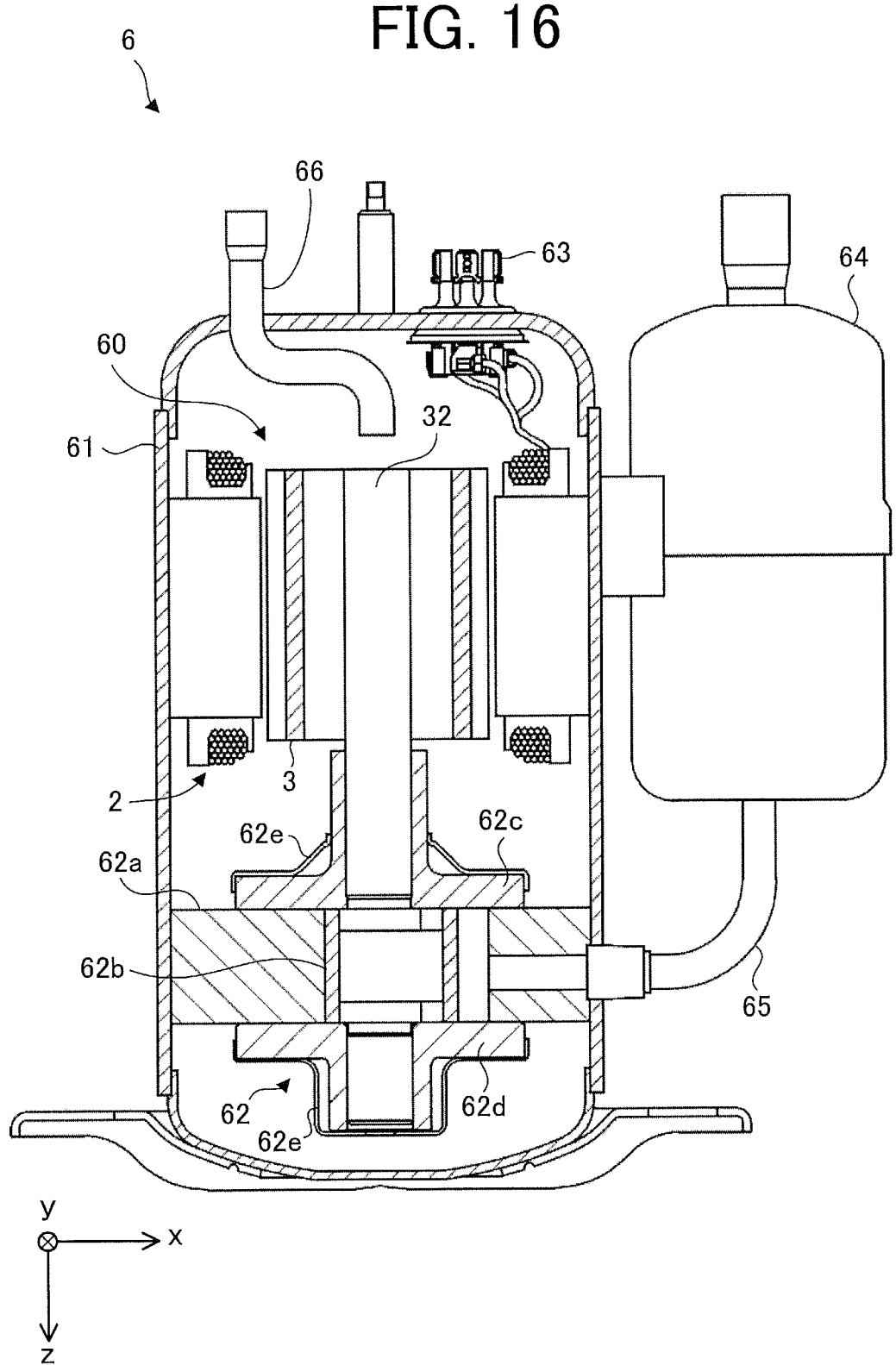
FIG. 16 is a sectional view schematically illustrating the structure of a compressor according to Embodiment 2 of the present invention.

FIG. 16 is a sectional view schematically illustrating the structure of the compressor 6 according to Embodiment 2.

The compressor 6 includes an electric motor 60 as an electric power element, a sealed or closed container 61 as a housing, and a compression mechanism 62 as a compression element. In this Embodiment, the compressor 6 is implemented as a rotary compressor. However, the compressor 6 is not limited to the rotary compressor.

The electric motor 60 is identical to the electric motor 1 equipped with the stator 2 according to Embodiment 1 (including the stator according to each Modification). In this Embodiment, the electric motor 60 is designed as an interior permanent magnet motor, but it is not limited to this.

The closed container 61 covers the electric motor 60 and the compression mechanism 62. Freezer oil to lubricate the sliding portions of the compression mechanism 62 is stored at the bottom of the closed container 61.

The compressor 6 further includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e respectively mounted on the upper frame 62c and the lower frame 62d. The compression mechanism 62 further includes a vane to separate the cylinder 62a into the suction and compression sides. The compression mechanism 62 is driven by the electric motor 60.

The electric motor 60 does not include the frame 4 illustrated in FIG. 1. The stator 2 of the electric motor 60 is fixed in the closed container 61 by press fitting or shrinkage fitting, in place of the frame 4. The stator 2 may be directly installed in the closed container 61 by welding instead of press fitting and shrinkage fitting.

Power is supplied to coils (for example, the windings 27 illustrated in FIG. 1) of the stator of the electric motor 60 via the glass terminal 63.

A rotor (more specifically, a shaft 32 of a rotor 3) of the electric motor 60 is rotatably held by the upper frame 62c and the lower frame 62d through bearing portions respectively provided on the upper frame 62c and the lower frame 62d.

The shaft 32 is inserted in the piston 62b. The shaft 32 is rotatably inserted in the upper frame 62c and the lower frame 62d. The upper frame 62c and the lower frame 62d close the end faces of the cylinder 62a. The accumulator 64 supplies a refrigerant (for example, a refrigerant gas) to the cylinder 62a via the suction pipe 65.

The operation of the compressor 6 will be described below. The refrigerant supplied from the accumulator 64 is drawn by suction into the cylinder 62a from the suction pipe 65 fixed to the closed container 61. As the electric motor 60 rotates by inverter power supply, the piston 62b fitted to the shaft 32 rotates in the cylinder 62a. With this operation, the refrigerant is compressed in the cylinder 62a.

The refrigerant ascends in the closed container 61 through the mufflers 62e. The compressed refrigerant is mixed with the freezer oil. As for the mixture of the refrigerant and the freezer oil, separation between the refrigerant and the freezer oil is accelerated in passing through the air holes 36 formed in the rotor core 31, so that the freezer oil can be prevented from flowing into the discharge pipe 66. In this way, the compressed refrigerant is supplied to the high-pressure side of a refrigeration cycle through the discharge pipe 66.

As the refrigerant of the compressor 6, R410A, R407C, or R22, for example, can be used. However, the refrigerant of the compressor 6 is not limited to these examples. As the refrigerant of the compressor 6, a low-GWP (Global Warming Potential) refrigerant, for example, can be used.

As typical examples of the low-GWP refrigerant, the following refrigerants are available.

(1) An exemplary halogenated hydrocarbon having a carbon-carbon double bond in its composition is HFO-1234yf ($CF_3CF=CH_2$). HFO is an abbreviation of Hydro-Fluoro-Olefin. Olefin is an unsaturated hydrocarbon having only one double bond. The GWP of HFO-1234yf is 4.

(2) An exemplary hydrocarbon having a carbon-carbon double bond in its composition is R1270 (propylene). R1270 has a GWP of 3, which is lower than the GWP of HFO-1234yf, but R1270 is more flammable than HFO-1234yf.

(3) An exemplary mixture containing at least one of a halogenated hydrocarbon having a carbon-carbon double bond in its composition or a hydrocarbon having a carbon-carbon double bond in its composition is a mixture of HFO-1234yf and R32. Since HFO-1234yf is a low-pressure refrigerant and therefore causes a considerable pressure loss, it readily degrades the performance of the refrigeration cycle (especially in an evaporator). It is, therefore, desired to use a mixture with, for example, R32 or R41, which is a high-pressure refrigerant.

The compressor 6 according to Embodiment 2 has not only the effects described in Embodiment 1 (including each Modification), but also the following effects.

With the stator 2 being fixed in the closed container 61 by press fitting or shrinkage fitting, a stress occurs in the yoke portion 21a of the stator 2. In this case, the magnetic characteristics in the yoke portion 21a readily degrade. However, the yoke portion 21a contributes to the efficiency of the electric motor 60 less than the tooth portion 22a. Therefore, as described in Embodiment 1, in the electric motor 60, since the magnetic characteristics of the tooth portion 22a (including each Modification) highly contributing to the efficiency of the electric motor 60, especially those of the tooth end surface 222, are improved, the efficiency of the electric motor 60 can also be improved, and a compressor 6 exhibiting high compression efficiency can thus be provided.

Embodiment 3

A refrigerating and air conditioning apparatus 7 including the compressor 6 according to Embodiment 2 will be described below.

Figure 17:
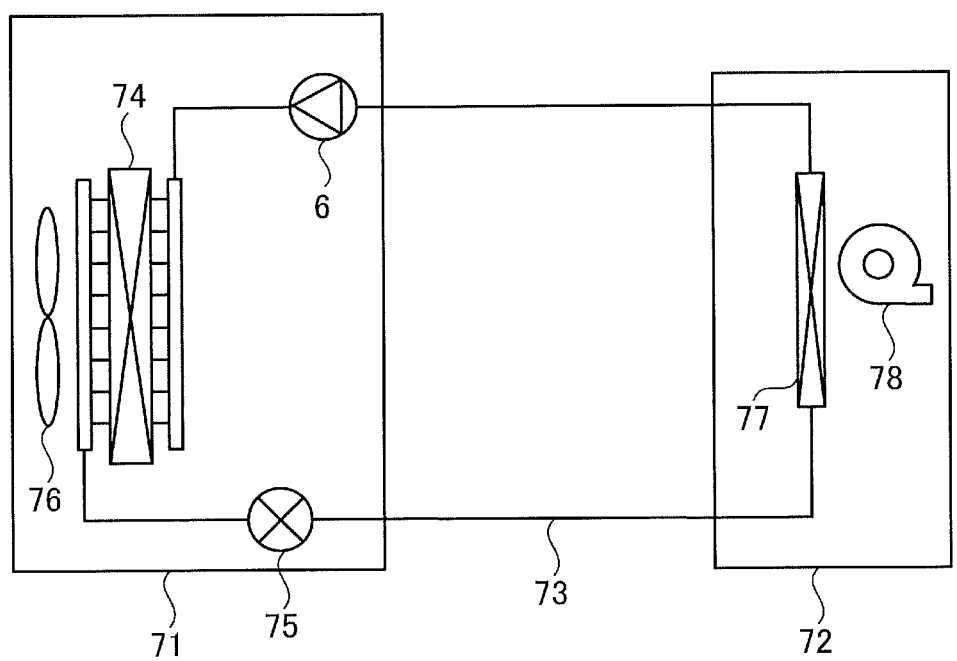
FIG. 17 is a diagram schematically illustrating the configuration of a refrigerating and air conditioning apparatus according to Embodiment 3 of the present invention.

FIG. 17 is a diagram schematically illustrating the configuration of the refrigerating and air conditioning apparatus 7 according to Embodiment 3 of the present invention.

The refrigerating and air conditioning apparatus 7 serves as, for example, an air conditioner capable of cooling and heating operations. The refrigerant circuit diagram illustrated in FIG. 17 is an exemplary refrigerant circuit diagram of an air conditioner capable of a cooling operation.

The refrigerating and air conditioning apparatus 7 according to Embodiment 3 includes an outdoor unit 71, an indoor unit 72, and refrigerant piping 73 connecting the outdoor unit 71 to the indoor unit 72 to form a refrigerant circuit (refrigeration circuit).

The outdoor unit 71 includes the compressor 6, a condenser 74, a throttling device or expansion valve 75, and an outdoor fan 76 (first fan). The condenser 74 condenses a refrigerant compressed by the compressor 6. The expansion valve 75 controls the flow rate of the refrigerant by decompressing the refrigerant condensed by the condenser 74.

The indoor unit 72 includes an evaporator 77 and an indoor fan 78 (second fan). The evaporator 77 cools indoor air by evaporating the refrigerant decompressed by the expansion valve 75.

The basic operation in the cooling mode of the refrigerating and air conditioning apparatus 7 will be described below. In the cooling operation, the refrigerant is compressed by the compressor 6 and flows into the condenser 74. The refrigerant is condensed by the condenser 74, and the condensed refrigerant flows into the expansion valve 75. The refrigerant is decompressed by the expansion valve 75, and the decompressed refrigerant flows into the evaporator 77. The refrigerant evaporates in the evaporator 77 into a refrigerant gas, which flows into the compressor 6 of the outdoor unit 71 again. The outdoor fan 76 delivers outdoor air to the condenser 74, and the indoor fan 78 delivers indoor air to the evaporator 77, to exchange heat between the refrigerant and the air.

The above-mentioned configuration and operation of the refrigerating and air conditioning apparatus 7 are merely examples, and are not limited to the above-mentioned examples.

The refrigerating and air conditioning apparatus 7 according to Embodiment 3 has not only the effects described in Embodiments 1 and 2, but also the following effect.

Since the refrigerating and air conditioning apparatus 7 according to Embodiment 3 includes a compressor 6 exhibiting high compression efficiency, a highly efficient refrigerating and air conditioning apparatus 7 can be provided.

While preferred embodiments have been described in detail above, it would be apparent to those skilled in the art that various changes may be made based on the basic technical concept and teaching of the present invention.

The features in each Embodiment and the features in each Modification, described above, can be combined together as appropriate.

What is claimed is:
1. A stator comprising:
a yoke portion; and
a tooth portion located inside the yoke portion in a radial direction,
wherein at least a part of an inner surface of the tooth portion in the radial direction is a surface formed by etching,
a fracture surface ratio of the inner surface is lower than a fracture surface ratio of a side surface of the yoke portion,
the fracture surface ratio of the inner surface is a ratio of an area of a fracture surface formed on the inner surface to a total area of a distal end of the tooth part, the fracture surface being a surface formed by brittle fracture, and the fracture surface ratio of the side surfaces of the yoke portion is a ratio of an area of a fracture surface formed on the side surfaces to a total area of the side surfaces, the fracture surface being a surface formed by brittle fracture.

2. The stator according to claim 1, wherein a dislocation density of the inner surface of the tooth portion is lower than a dislocation density of the side surface of the yoke portion.

3. The stator according to claim 1, wherein the inner surface of the tooth portion is formed of a corrosion surface.

4. The stator according to claim 1, wherein a silicon concentration of the tooth portion is higher than a silicon concentration of the yoke portion.

5. The stator according to claim 1, wherein Vickers hardness of the tooth portion is higher than Vickers hardness of the yoke portion.

6. The stator according to claim 1, wherein
the yoke portion includes a first sheet, and
the tooth portion includes a second sheet.

7. The stator according to claim 6, wherein the second sheet is mounted at an inner end of the first sheet in the radial direction.

8. The stator according to claim 6, wherein materials of the first sheet and the second sheet are different from each other.

9. The stator according to claim 6, wherein the first sheet is made of an electrical steel sheet.

10. The stator according to claim 6, wherein the second sheet is made of an amorphous material.

11. The stator according to claim 6, wherein a thickness of the first sheet is 0.20 mm to 0.50 mm.

12. The stator according to claim 6, wherein a thickness of the second sheet is 10 µm to 100 µm.

13. The stator according to claim 6, wherein the yoke portion is formed by press working.

14. A stator comprising:
a yoke portion; and
a tooth portion located inside the yoke portion in a radial direction, wherein
a fracture surface ratio of an inner surface of the tooth portion in the radial direction is lower than a fracture surface ratio of side surfaces of the yoke portion,
the fracture surface ratio of the inner surface is a ratio of an area of a fracture surface formed on the inner surface to a total area of a distal end of the tooth part, the fracture surface being a surface formed by brittle fracture, and
the fracture surface ratio of the side surfaces of the yoke portion is a ratio of an area of a fracture surface formed on the side surfaces to a total area of the side surfaces, the fracture surface being a surface formed by brittle fracture.

15. An electric motor comprising:
a stator; and
a rotor provided inside the stator,
the stator comprising:
a yoke portion formed of at least one first sheet; and
a tooth portion formed of at least one second sheet and located inside the yoke portion in a radial direction,
wherein at least a part of an inner surface of the tooth portion in the radial direction is a surface formed by etching, a fracture surface ratio of the inner surface is lower than a fracture surface ratio of side surfaces of the yoke portion,
the fracture surface ratio of the inner surface is a ratio of an area of a fracture surface formed on the inner surface to a total area of a distal end of the tooth part, the fracture surface being a surface formed by brittle fracture, and
the fracture surface ratio of the side surfaces of the yoke portion is a ratio of an area of a fracture surface formed on the side surfaces to a total area of the side surfaces, the fracture surface being a surface formed by brittle fracture.

16. The electric motor according to claim 15, wherein the rotor includes:
a magnet insertion hole;
a permanent magnet inserted in the magnet insertion hole; and
a slit formed outside the magnet insertion hole in the radial direction.

17. The electric motor according to claim 16, wherein the permanent magnet is magnetized in the radial direction.

18. A compressor comprising:
an electric motor;
a compression mechanism driven by the electric motor; and
a housing covering the electric motor and the compression mechanism,
the electric motor comprising:
a stator; and
a rotor provided inside the stator,
the stator comprising:
a yoke portion formed of at least one first sheet; and
a tooth portion formed of at least one second sheet and located inside the yoke portion in a radial direction,
wherein at least a part of an inner surface of the tooth portion in the radial direction is a surface formed by etching,
a fracture surface ratio of the inner surface is lower than a fracture surface ratio of a side surface of the yoke portion,
the fracture surface ratio of the inner surface is a ratio of an area of a fracture surface formed on the inner surface to a total area of a distal end of the tooth part, the fracture surface being a surface formed by brittle fracture, and
the fracture surface ratio of the side surfaces of the yoke portion is a ratio of an area of a fracture surface formed on the side surfaces to a total area of the side surfaces, the fracture surface being a surface formed by brittle fracture.

19. The compressor according to claim 18, wherein the stator is fixed in the housing by press fitting or shrinkage fitting.

20. A refrigerating and air conditioning apparatus comprising:
an indoor unit; and
an outdoor unit including the compressor according to claim 18 and connected to the indoor unit.

21. A method for manufacturing a stator including a yoke portion and a tooth portion located inside the yoke portion in a radial direction, the method comprising:
forming a plurality of sheets into shapes of the yoke portion and the tooth portion;
stacking the plurality of sheets; and
forming at least a part of an inner surface of the tooth portion in the radial direction by etching so that a fracture surface ratio of the inner surface is lower than a fracture surface ratio of a side surface of the yoke portion, wherein the fracture surface ratio of the inner surface is a ratio of an area of a fracture surface formed on the inner surface to a total area of a distal end of the tooth part, the fracture surface being a surface formed by brittle fracture, and the fracture surface ratio of the side surfaces of the yoke portion is a ratio of an area of a fracture surface formed on the side surfaces to a total area of the side surfaces, the fracture surface being a surface formed by brittle fracture.

22. A method for manufacturing a stator including a yoke portion and a tooth portion located inside the yoke portion in a radial direction, the method comprising:

forming a plurality of sheets into a shape of the yoke portion by press working;

forming the plurality of sheets into a shape of the tooth portion;

stacking the plurality of sheets; and forming at least a part of an inner surface of the tooth portion in the radial direction by etching so that a fracture surface ratio of the inner surface is lower than a fracture surface ratio of a side surface of the yoke portion, wherein the fracture surface ratio of the inner surface is a ratio of an area of a fracture surface formed on the inner surface to a total area of a distal end of the tooth part, the fracture surface being a surface formed by brittle fracture, and the fracture surface ratio of the side surfaces of the yoke portion is a ratio of an area of a fracture surface formed on the side surfaces to a total area of the side surfaces, the fracture surface being a surface formed by brittle fracture.

* * * * *